(12) United States Patent
Glaun

(10) Patent No.: US 8,196,892 B2
(45) Date of Patent: Jun. 12, 2012

(54) FLUID CONTROL VALVE

(75) Inventor: J. Asher Glaun, Sharon, MA (US)

(73) Assignee: Dresser, Inc., Addison, TX (US)

( * ) Notice: Subject to any disclaimer, the term of this patent is extended or adjusted under 35 U.S.C. 154(b) by 775 days.

(21) Appl. No.: 12/337,184

(22) Filed: Dec. 17, 2008

(65) Prior Publication Data
US 2010/0148108 A1    Jun. 17, 2010

(51) Int. Cl.
*F16K 31/12* (2006.01)

(52) U.S. Cl. .......... 251/25; 251/38; 251/43; 251/60; 251/285; 137/630.14; 137/630.22; 137/625.38

(58) Field of Classification Search .......... 251/12, 251/28, 25, 30.02–30.05, 33, 38, 43, 60, 251/284, 285, 287, 288, 77; 137/630.13–630.15, 137/630, 630.22, 625.38
See application file for complete search history.

(56) References Cited

U.S. PATENT DOCUMENTS

| | | | | |
|---|---|---|---|---|
| 1,416,391 | A | * | 5/1922 | Van Brunt ............ 251/234 |
| 1,902,336 | A | * | 3/1933 | Murray ............ 251/231 |
| 1,942,426 | A | * | 1/1934 | Hunter et al. ............ 137/625.3 |
| 1,998,239 | A | * | 4/1935 | Irwin ............ 137/625.3 |
| 2,034,573 | A | * | 3/1936 | Goehring ............ 137/625.3 |
| 2,180,188 | A | * | 11/1939 | Ashworth ............ 137/630.14 |
| 3,212,524 | A | * | 10/1965 | Caldwell ............ 137/625.3 |
| 4,451,047 | A | * | 5/1984 | Herd et al. ............ 277/539 |
| 5,186,393 | A | * | 2/1993 | Yie ............ 239/583 |
| 5,564,674 | A | | 10/1996 | Kalin et al. |
| 5,947,443 | A | | 9/1999 | Shellenbarger et al. |
| 6,758,232 | B2 | | 7/2004 | Higuchi |
| 6,807,985 | B2 | | 10/2004 | Stares et al. |
| 6,935,371 | B2 | | 8/2005 | Stares |
| 6,981,691 | B2 | | 1/2006 | Caprera |
| 7,104,281 | B2 | | 9/2006 | Stares et al. |
| 7,363,941 | B2 | | 4/2008 | Caprera |
| 2005/0034770 | A1 | | 2/2005 | Stares et al. |

FOREIGN PATENT DOCUMENTS

DE    3623182 A1    1/1988
(Continued)

OTHER PUBLICATIONS

International Preliminary Report on Patentability for PCT/US2009/067864 mailed on May 26, 2011 (14 pages).
(Continued)

*Primary Examiner* — John Fristoe, Jr.
*Assistant Examiner* — Marina Tietjen
(74) *Attorney, Agent, or Firm* — Woodcock Washburn LLP

(57) ABSTRACT

A valve includes a body, a cage, a plug, a stem, a stop ring, and a pilot plug. The cage includes at least one cage port there through allowing fluid communication between the fluid inlet and the fluid outlet. The plug is movable linearly within the cage to allow fluid communication between the fluid inlet and the fluid outlet when the valve is open. The pilot plug is adapted to transfer downward force from the stem to the plug by contacting the stop ring of the plug and thereby urging the plug downward through the cage when the stem moves linearly downward to adjust the valve from the closed position to the open position. In an alternative embodiment, the stem includes a collar adapted to contact the plug and adjust the valve from the closed position to an open position.

29 Claims, 9 Drawing Sheets

FOREIGN PATENT DOCUMENTS

| EP | 0 726 413 A1 | 8/1996 |
| FR | 2 727 734 A1 | 6/1996 |
| FR | 2 792 056 A1 | 10/2000 |

OTHER PUBLICATIONS

Notification of Transmittal of the International Search Report and the Written Opinion of the International Searching Authority, or Declaration (3 pages); International Search Report (4 pages); and Written Opinion of the International Searching Authority (8 pages), mailed Mar. 18, 2010, for related international application PCT/US2009/067864.

Notification of Transmittal of the International Preliminary Report on Patentability (14 pages), mailed May 26, 2011, for related international application PCT/US2009/067864.

* cited by examiner

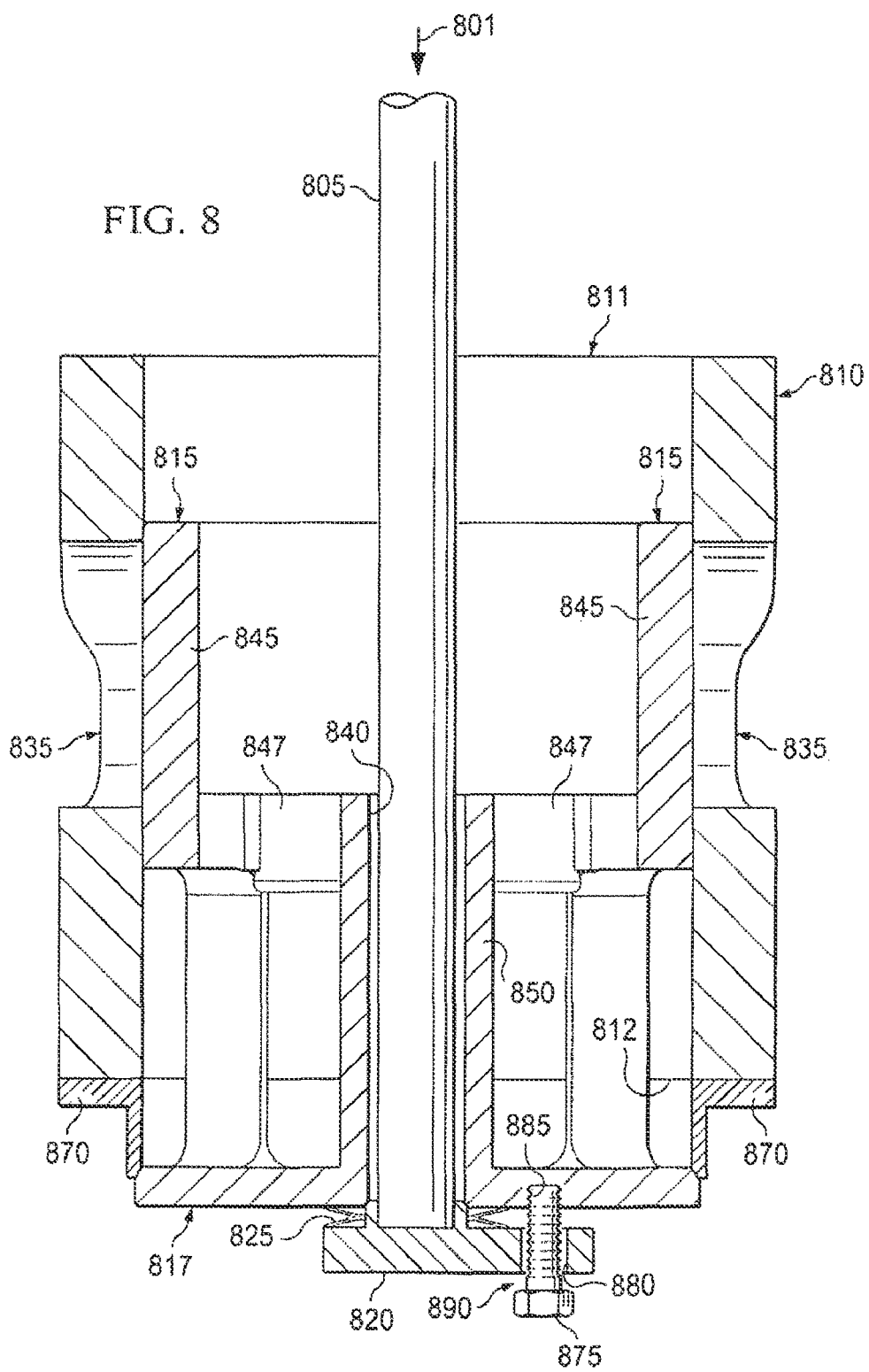

FLUID CONTROL VALVE

TECHNICAL FIELD

This description relates to fluid regulation, and more particularly to regulating fluid flow by a pilot plug operated control valve.

BACKGROUND

Fluid systems, such as cooling, heating, petroleum refining, pneumatic or other vapor or gas system, waste water control, or chemical process systems, typically utilize valves to control fluid flow. These fluid control devices may include a variety of different types, sizes, and configurations of valves, such as globe valves, ball valves, butterfly valves, and plug valves.

Several factors affect the design of fluid control valves. As used herein fluid may encompass, liquid, vapor, gas or a mixture of any of these fluid phases. The type of fluid that is regulated by the valve may influence the materials and dimensions of the valve components. For example, some gasoline refining applications may require valves to control the flow of a high-temperature fluid including crude oil and erosive particulates, such as dirt and/or certain catalytic agents. As this erosive fluid flows through the valve, the components may be subjected to temperatures in excess of 500° Fahrenheit and in extreme cases in excess of 1000° Fahrenheit and pressure differential across the valve greater than 3000 psi. High pressure drops in the flowing liquid may result in cavitation, which may damage valve components. In pipeline service, valves may be subjected to high pressure differentials across valve seats that result in high closing forces placed on a valve actuator when opening and closing the valve. These are some of the factors that should be considered when selecting a type of valve for a particular type of service.

External factors, such as noise attenuation, may also affect the choice of fluid control valves. For example, design considerations may indicate that a control valve operating in an expanding flow direction such that the fluid flows in a radially outward direction passing through the cage (e.g., flow moving upward, through the cage aid expanding toward a greater volume in the valve gallery) is preferable. Such valves, for instance, may be desirable for compressible flow applications where flow noise minimization is important. Further, design considerations may indicate that a pilot plug operated control valve may be preferable. Pilot plug operated control valves, however, may often be limited to a downward flow design where the control valve operates in a contracting flow direction such that the fluid flows in a radially inward direction passing through the cage. Additionally, in some instances, design considerations may indicate that a pressure balanced pilot plug operated control valve (e.g., pressure on both sides of the plug is the same when valve is closed) may be preferable rather than a pressure unbalanced valve (e.g., pressure is different on either side of the plug when valve is closed).

Currently, a variety of seals are available to produce a balanced valve. Such seals may be utilized between a plug and a cage of a control valve. For instance, piston ring seals between the cage and plug may be manufactured from multiple distinct materials depending on the valve application (i.e., type of fluid, temperature, pressure). Teflon, metal, and graphite are just a handful of examples of materials from which such piston ring seals may be made. Teflon piston ring seals, for instance, may allow for a reasonably tight shut-off but be limited in usage by fluid temperature. Graphite and metal piston ring seals may allow for the valve to be used in higher temperature applications, but such materials may not allow for tight shut-off (e.g., ANSI FCI 70-2 Class IV or lower).

Balanced valves may also utilize pressure energized seals, which may allow flow in both directions with a reversible seal. Such seals may generally be manufactured of engineered plastics and can produce excellent shut-off characteristics (e.g., ANSI Class V). Valves utilizing pressure energized seals, however, may be temperature limited in their applicability.

Deformable metal seals may also provide for a pressure balanced control valve. Deformable metal sealing, typically, may allow for a tight shut-off by forming a metal-to-metal seal between the plug and the cage. Further, such seals may allow for a valve to be utilized in high temperature applications. A tight shut-off through deformable metal seals, however, may be dependent on precise manufacturing tolerances, thus increasing the cost of valve production. Additionally, deformable metal seals may deteriorate over time.

Accordingly, certain fluid regulation applications and systems may be best suited for a control valve operable in an expanding flow direction, while maintaining tight shut-off capability and a wide range of temperature and pressure applicability.

SUMMARY

In one general implementation, a valve according to the present disclosure includes a body, a cage, a plug, a stem, a stop ring, and a pilot plug. The body includes a fluid inlet and a fluid outlet in fluid communication with a gallery, where the gallery is closed at a first end with a bonnet. The cage is disposed within the gallery and includes at least one cage port there through allowing fluid communication between the fluid inlet and the fluid outlet when the valve is in an open position. The plug is movably disposed within the cage and includes an outer wall and an inner wall. The outer wall of the plug is disposed adjacent the cage port and movable linearly to substantially prevent fluid communication between the fluid inlet and the fluid outlet when the valve is in a closed position. The plug is movable linearly within the cage to allow fluid communication between the fluid inlet and the fluid outlet when the valve is in the open position. The inner wall defines a flow passage through at least a portion of the plug. The stem extends through the flow passage. An inboard end of the stem is disposed in a lower portion of the flow passage and an outboard end of the stem extends through the cage and an aperture in the bonnet to an exterior of the body. The stop ring is detachably secured to the plug proximate to the lower portion of the flow passage. The pilot plug is coupled to the inboard end of the stem and is disposed in the lower portion of the flow passage. The pilot plug is adapted to transfer downward force from the stem to the plug by contacting the stop ring of the plug and, thereby, urging the plug downward through the cage when the stem moves linearly downward through the flow passage away from the bonnet to adjust the valve from the closed position to the open position.

In specific implementations, the pilot plug may transfer upward force from the stem to the plug by contacting the plug; thereby, urging the plug upward through the cage when the stem moves linearly upward through the flow passage toward the bonnet to adjust the valve from the open position to the closed position. Also, the lower portion of the flow passage may include an increased diameter portion, where the stop ring is detachably secured to the plug therein. The plug may further include a base and the valve may further include a seat detachably secured to the cage. In a closed position of the valve, the base of the plug may be contact with the seat to substantially prevent fluid communication between the fluid inlet and the gallery.

In particular embodiments, the body may further include a bridge extending into the gallery from the body, where the seat is detachably secured to the bridge. Additionally, the cage port may be formed in an upper half of the cage proximate to the first end of the gallery. At least one cage port may be at least one of the following: an equal percentage characterized cage port; a linear characterized cage port; a parabolic characterized cage port; a modified linear characterized cage port; a modified parabolic characterized cage port; or a plurality of apertures formed along a substantial entirety of a circumference of the cage. In specific embodiments, the cage port may include a funneled upper portion closest to the first end and a substantially square lower portion opposite the funneled upper portion.

Specific embodiments of the valve may further include at least one pilot spring in contact with the pilot plug and the plug. The pilot spring may include a coil spring or a Belleville washer. The pilot spring may be located in a cavity defined by a downward facing ledge and a cylindrical wall of an increased diameter lower portion of the flow passage. In particular aspects of the valve, the pilot spring may contact the downward facing ledge and an upper surface of the pilot plug.

In some embodiments, the pilot plug may have at least one flow conduit disposed there through. The pilot plug may be in contact with the plug; thereby, substantially preventing fluid communication between the fluid inlet and the flow passage in the plug when the valve is in the closed position. The pilot plug may include a first seating surface and the plug, may include a second seating surface, where the first and second seating surfaces in contact thereby substantially prevent fluid communication between the fluid inlet and the flow passage in the plug when the valve is in the closed position. In some aspects, at least one of the first and second surfaces comprises, at least in part, an increased hardness material.

In some specific implementations, the valve may further include a contact member disposed on the stem and adapted to contact an upper surface of the inner wall of the plug when the valve is adjusted the valve from the closed position to the open position. Further, the flow conduit may allow fluid communication between the fluid inlet and the flow passage of the plug as the valve is adjusted from the closed position to the open position. Specific embodiments of the valve may also include an actuator coupled to the stem, where the actuator is adapted to apply an upward force on the pilot plug to bring the pilot plug in contact with the plug as the valve is adjusted to the closed position. The plug may also include a lattice connecting the inner wall and the outer wall of the plug, where the lattice includes one or more apertures allowing fluid communication there through.

In another general implementation, a method of regulating fluid with a valve includes providing a valve in fluid communication with a fluid inlet and a fluid outlet, where the valve includes a body including a gallery in fluid communication with the fluid inlet and the fluid outlet, the gallery being closed at a first end with a bonnet; a cage disposed within the gallery and including at least one cage port there through; a plug movably disposed within the cage and including an outer wall and an inner wall, where the outer wall of the plug is disposed adjacent the cage port; a stem extending through the flow passage with an inboard end of the stem disposed in a lower portion of the flow passage and an outboard end of the stem extending through the cage and an aperture in the bonnet to an exterior of the body; a stop ring detachably secured to the plug proximate to the lower portion of the flow passage; a pilot plug coupled to the inboard end of the stem and disposed in the lower portion of the flow passage; and a seat adjacent a bottom surface of the cage and in contact with the plug. The method also includes providing a fluid to the fluid inlet; applying a first downward force on the pilot plug via the stem; unseating the pilot plug from the inner wall; and allowing a portion of the fluid to communicate from the fluid inlet through the flow passage.

In specific implementations of the method, the step of allowing a portion of the fluid to communicate from the fluid inlet through the flow passage may include allowing a portion of the fluid to communicate from the fluid inlet through one or more conduits disposed through the pilot plug to the flow passage. In certain embodiments, the provided valve may further include at least one pilot spring in contact with the plot plug and the plug, where the pilot spring exerts a downward spring force on the pilot plug. The sum of the downward spring force and the first downward force may be greater than an upward fluid force exerted on the pilot plug substantially equal to a differential fluid pressure across the pilot plug times a surface area defined by a circumference of contact between the pilot plug and the inner wall.

In particular implementations, the method may further include the steps of applying a second downward force on the pilot plug via the stem to move the pilot plug downward; contacting the stop ring of the plug with a lower surface of the pilot plug; unseating the plug from the seat; translating the plug downward to expose at least a portion of the at least one cage port; and allowing a portion of the fluid to communicate between the fluid inlet and the at least one cage port through the web. In certain embodiments, the method may further include the steps of applying a second downward force on the pilot plug via the stem to move the pilot plug downward; contacting an upper surface of the interior wall of the plug with a contact member disposed on the stem; unseating the plug from the seat; translating the plug downward to expose at least a portion of the at least one cage port; and allowing a portion of the fluid to communicate between the fluid inlet and the at least one cage port through the web.

In some aspects of the method, the step of applying a second downward force on the pilot plug via the stem may include applying a second downward force greater than a difference between a second upward fluid force substantially equal to a second differential fluid pressure across the plug times a surface area defined by a circumference of contact between the plug and the seat and the downward spring force.

Various implementations of a pilot plug operated control valve according to the present disclosure may include one or more features. For example, the pilot plug operated control valve may allow for reduced flow noise during operation in applications where fluid flow noise is a concern. The pilot plug operated control valve may further provide for good noise attenuation in compressible flow applications. As another example, the pilot plug operated control valve may be better suited to a variety of different piping configurations. Also, the pilot plug operated control valve may utilize the full line fluid pressure to maintain a tight shut-off and low fluid leakage through, for example, the application of the fluid pressure across the surface area of the primary plug. The pilot plug operated control valve may also allow for about a ten times reduction in force required to open the valve based on a pilot plug diameter of about one-third of the primary plug diameter.

Implementations of a pilot plug operated control valve according to the present disclosure may also allow for a reduction in valve actuator size or power output capability relative to fluid pressure. The pilot plug operated control valve may also allow for the elimination of one or more soft seals while still achieving a tight shut-off; thereby, allowing the material characteristics of the valve body and internal trim components to dictate the allowable fluid temperature. In addition, the pilot plug operated control valve may be manufactured to existing design tolerances of general-purpose control valves while still allowing for tight shut-off. Further, the pilot plug operated control valve may allow for effective noise attenuation in a valve application where a combination of high pressure and size requires a balanced valve and where high temperatures restrict the use of elastomeric seals. A pilot plug operated control valve may also provide for fail-to-close operation in an expanding flow direction, such that the loss of actuator power tends to shut the valve.

These general and specific aspects may be implemented using a device, system, or method, or any combinations of devices, systems, or methods. The details of one or more implementations are set forth in the accompanying drawings and the description below. Other features will be apparent from the description and drawings, and from the claims.

DESCRIPTION OF DRAWINGS

FIG. 8 illustrates a partial cross-sectional view of internal components of a further alternative embodiment of a pilot plug operated control valve in accordance with the present disclosure.

Like reference symbols in the various drawings indicate like elements.

DETAILED DESCRIPTION

Fluid regulation may be accomplished by a variety of different methods and devices, such as control valves. As used herein fluid may encompass, liquid, vapor, gas or a mixture of any of these fluid phases. Control valves are often used to throttle or completely shut-off fluid flow through a system, and many different design considerations may affect the type of control valve to be used in a particular system. One type of control valve is a pilot plug operated control valve. The present disclosure describes a pilot plug operated control valve that may throttle or otherwise regulate flow of a fluid. The pilot plug operated control valve includes a cage with one or more cage ports and a primary plug linearly movable through the cage. A stem extends through the cage and a flow passage of the plug defined by an interior wall of the primary plug and is coupled to a pilot plug at an inboard end of the stem. An outboard end of the stem is coupled to a valve actuator. To adjust the valve from a closed position to an open position, a downward force is transmitted from the actuator to the pilot plug; thereby, urging the pilot plug downward to move the primary plug linearly downward through the cage. As the primary plug moves downward though the cage, the cage ports are exposed; thereby, allowing fluid communication between a valve inlet and valve outlet.

Figure 1:
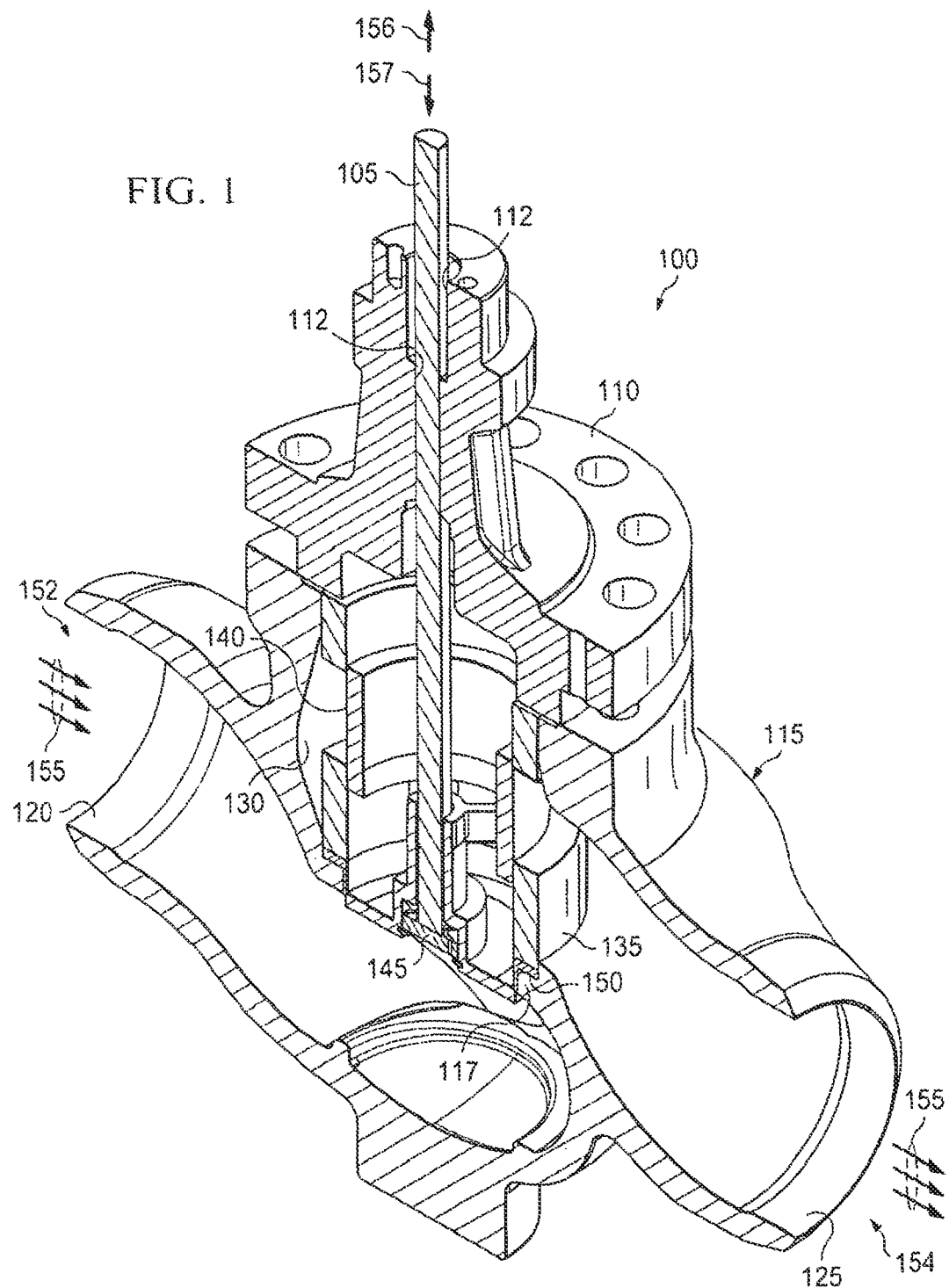
FIG. 1 illustrates a cross-section of a perspective view from above of a pilot plug operated control valve in accordance with the present disclosure.

FIG. 1 illustrates a cross-sectional view of a pilot plug operated control valve 100. In some embodiments, the valve 100 may be a pressure balanced control valve operable in an expanding flow direction (e.g., flow under the plug). Valve 100 includes a bonnet 110, a stem 105, and a body 115 including a gallery 130 enclosing a cage 135, a linearly movable primary plug 140, a seat 150, and a linearly movable pilot plug 145, among other components. The body 115 also includes a fluid inlet 120 and a fluid outlet 125; thereby, allowing a fluid 155 to pass through and otherwise be regulated by the valve 100. In a fully closed position (as illustrated in FIG. 1), fluid pressure from the fluid at an upstream flow 152 of the valve 100 is exerted under the primary plug 140 and pilot plug 145. Fluid 155 at a downstream flow 154 may be at a reduced pressure compared to the fluid 155 at the upstream flow 152.

In certain embodiments, the valve 100 may regulate a high temperature, high pressure fluid, such as a hydrocarbon liquid or gas, process chemical fluid, or corrosive fluids, such as certain catalytic agents. Generally, the valve 100 is a globe valve utilizing linear motion to open and close the primary plug 140 and pilot plug 145, thus allowing or preventing, respectively, fluid communication between the fluid inlet 120 and fluid outlet 125 through the gallery (cavity) 130. Such linear motion may be applied, for example, by an actuator (not shown) coupled to the stem 105 to operate the various components contained in the cavity 130.

The materials of which the various components of the valve 100 may be manufactured may be dependent upon operating pressure of the fluid 155, operating temperature of the fluid 155, chemical characteristics of the fluid 155, cost, and piping system considerations. For example, corrosive fluid applications may require one or more of the stem 105, bonnet 110, body 115, cage 135, primary plug 140, seat 150, and pilot plug 145 to be made from stainless steel or any other appropriate corrosion-resistant material (e.g., titanium, duplex stainless steels, Nickel alloys).

The stem 105, typically, is a rod of circular cross-section disposed through a centerline of the bonnet 110 and into the gallery 130 of the body 115. Although illustrated as a substantially cylindrical element with constant radial dimension, the stem 105 may be of varying cross-section (e.g., square, keyed) and varying outer dimension along its length, as the fluid regulation application may dictate. The stem 105 is also generally constrained to move linearly within an interior aperture 112 of the bonnet 110 and a flow passage of the primary plug 140 (shown in more detail in FIGS. 2, 3-5). A valve actuator (not shown) may be coupled to the stem 105 at an outboard end of the stem 105 exposed from the valve 100 through the bonnet 110. The actuator, for example, a pneumatically powered, an electrically powered or hydraulically powered actuator, may provide a downward force on the stem 105 to place the stem 105 in compression to move the pilot plug and plug downward to open and an upward tension force to move the pilot plug and plug upward to close the valve 100. It will be understood that "up" or "upwards" as referred to in this disclosure is a direction of 156 wherein the stem 105 moves outwards and away from the valve bonnet 110 and "down" or "downward" is direction 157 wherein the stem 105 moves inwards through aperture 112 in bonnet 110. However, such directions are not meant to limit the valves applicability and suitability for use in an inverted or other position. The directions up and down or upwards and downwards are meant for ease of reference and understanding, not with regards to limiting the position of the valve in service.

The stem 105 may also be located within the flow path of the fluid 155 as it is communicated from the fluid inlet 120 to the fluid outlet 125. Thus, as noted earlier, the stem 105 may be wrought rolled from an appropriate material as dictated by the fluid characteristics. Further mechanical design considerations for the stem 105 include the force to be applied to this component by the actuator to open and close the valve 100. For instance, the stem 100 must be of sufficient strength to resist buckling under a downward compressive force to open the valve 100 as well as resist deformation under a upwards tensile force to close the valve 100. The tensile force typically applied to the stem 105 to close the valve 100 may be greater than the compressive force applied to the stem 105 to open the valve 100. In some embodiments, the stem 105 may be longer than may be typical for cage-type control valves. Stem buckling, however, may not be a great concern, because, as noted above, the largest force placed on the stem 105 during valve operation may be a tensile force to adjust the valve 100 toward a closed position.

The bonnet 110 is generally circular in diameter and includes an elongated neck extending upward to restrain the stem 105 in its linear movement. In some embodiments, the elongated neck may be designed for the valve 100 to accommodate extreme fluid temperatures. Further, a bushing (not shown) may be included within an aperture 112 of the bonnet 110 to guide the stem 105. Generally, the bonnet 110 encloses a top opening of the valve body 15 and may be secured to the body 115 through a variety of methods. For instance, the bonnet 110 may, as illustrated, include a flanged portion with multiple boreholes though which bolts may be inserted to secure the bonnet 110 to the body 115. The bonnet 110 also encloses a top end of the gallery 130 in which the fluid throttling mechanism (e.g., the cage 135, the primary plug 140) are contained. Stem 105 will extend outwards through the aperture (opening) 112 in the bonnet 110. Stem 105 will be moved linearly by an actuator or other mechanical device (not shown) as is known in the art.

As with the stem 105, the bonnet 110 may be constructed of any appropriate material as dictated by the fluid regulation application. Further, in some embodiments, a gasket or seal ring may be interposed between the bonnet 110 and the body 115. Such sealing mechanism may, at least in part, prevent fluid 155 from leaking out of the valve 100 at the bonnet-body interface. Additionally, a gasket, sleeve, packing or other form of sealing mechanism may be interposed between the bonnet 110 and the stem 105; thereby, substantially preventing fluid 155 from exiting the opening 112 through the top of the bonnet 110 under typical and normal operating pressures.

Along with the bonnet, the valve body 115, generally, is the main pressure boundary of the valve 100 and constrains the fluid 155 and valve components in a rigid housing. Further, the body 115 generally provides pipe connections at the fluid inlet 120 and the fluid outlet 125 and a fluid path through the gallery 130 of the valve 100. In certain embodiments, for instance, the body 115 may include grooved connections at the fluid inlet 120 and the fluid outlet 125 to provide for coupling to a piping system. Alternatively, the body 115 may include flanged connections or provide for welded connections at the fluid inlet 120 and outlet 125. Further, in particular aspects of the valve 100, the body 115 may be manufactured as a single cast or forged component. Alternatively, the body 115 may be manufactured as a multiple piece component (e.g., clam shell) and secured to form a single body. Further, although fluid 155 is illustrated in a left-to-right flow direction in FIG. 1, in some embodiments of the valve 100, the flow direction of the fluid 155 may be reversed.

The gallery 130 of the valve 100 is generally cylindrical in shape and provides an open space into which the valve components may operate to open and close the valve 100, as well as providing a fluid pathway for the fluid 155 to flow through in route from the fluid inlet 120 to the fluid outlet 125. Typically, at least a portion of the stem 105 and the cage 135, the primary plug 140, the pilot plug 145, and the seat 150 are encapsulated within the gallery 130. At a lower end of the gallery 130, the body 115 includes a bridge 117 (e.g., a circular shelf) on which the seat 150 may rest or be secured thereto. As explained more fully with reference to FIGS. 2-5, one or more of the valve components move linearly upwards and downwards within the gallery 130 and valve body 115 and parallel to the longitudinal axis of the stem 105 to modify the flow rate of the fluid 155; thereby, allowing the valve 100 to modulate between fully closed and fully open.

Figure 2:
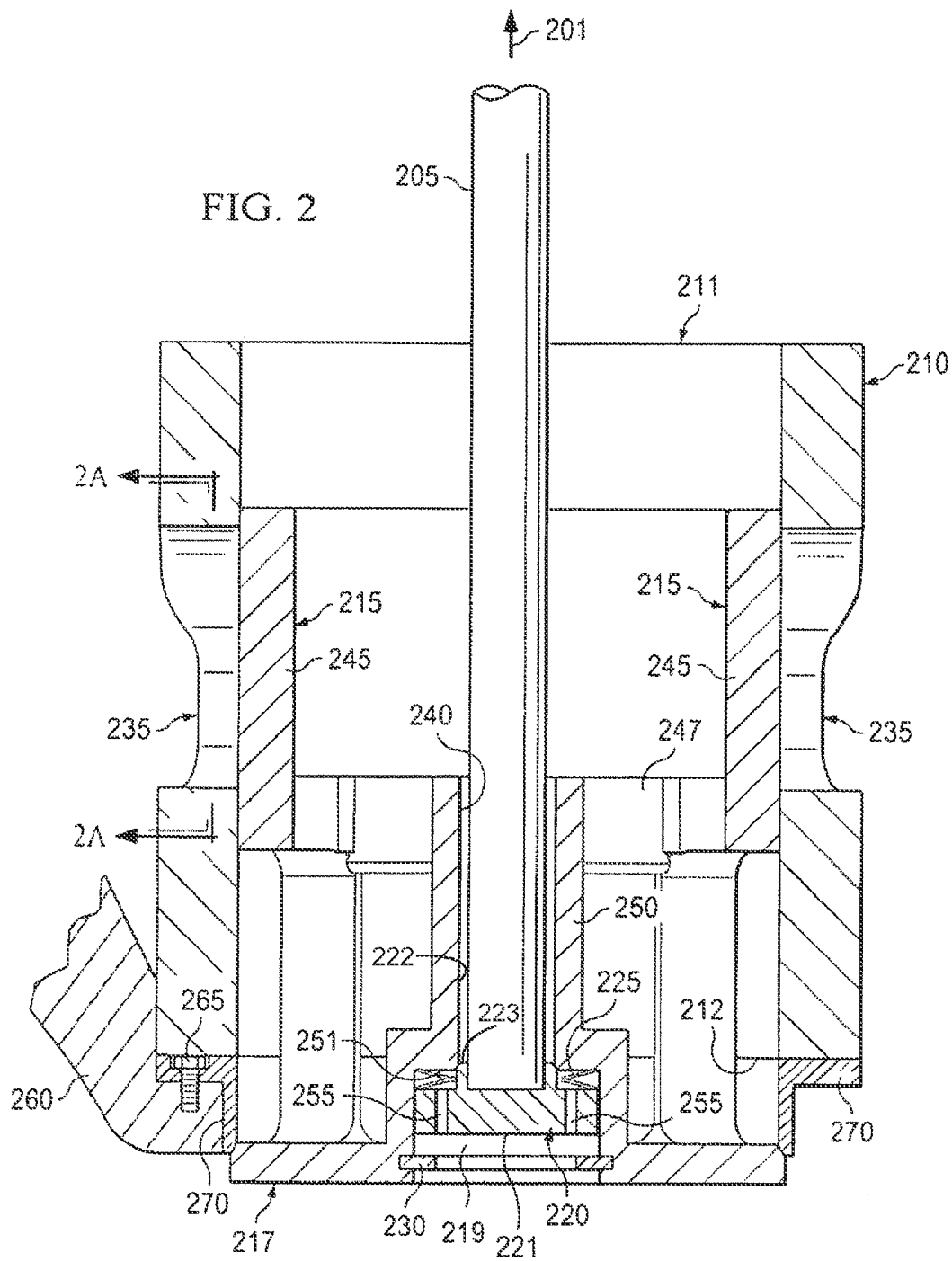
FIG. 2 illustrates a partial cross-sectional view of internal components of a pilot plug operated control valve in a closed position in accordance with the present disclosure.

FIG. 2 illustrates a cross-sectional view of certain internal components of a pilot plug operated control valve in a closed position. The pilot plug operated control valve, for example, may be substantially similar to the valve 100 illustrated in FIG. 1. Generally, FIG. 2 illustrates the internal components of the valve, at least some of which move linearly within the valve body to modulate the flow of fluid through the valve. The internal components include a stem 205, a cage 210, a primary plug 215, a pilot plug 220, and a primary seat 270. In some embodiments, the stem 205, cage 210, primary plug 215, pilot plug 220, and primary seat 270 are substantially identical to the corresponding components illustrated in FIG. 1.

The stem 205 extends linearly through the cage 210 and the primary plug 215 and is coupled to the pilot plug 220 within the valve body. Typically, the stem 205 includes an inboard end coupled to the pilot plug 220 and an outboard end extending to an exterior of the valve and coupled to an actuator. Upon actuation of the valve from a closed position to an open position, the stem 205 moves linearly downward through the valve body; thereby, transmitting a downward force on the pilot plug 220. In the valve closed position illustrated in FIG. 2, the actuator typically exerts a constant or substantially constant upward tensile force on the stem 205. This results in a male seating surface 223 on the upper portion of pilot plug 220 to contact a female seating surface 222 on the primary plug 215 to form a fluid tight seal.

The cage 210 is substantially cylindrical in shape and, as noted above, generally fits within the gallery 130 of the valve body. The cage 210 is open at a top end 211 and bottom end 212; thereby, allowing the stem 205 and the primary plug 215 to linearly move within the interior space of the cage 210 as the valve modulates between an open position and a closed position. In typical embodiments, a valve bonnet encloses the top end 211 of the cage 210 in the valve body. In such scenarios, or when the components of the valve may experience thermal expansion, a gasket or sealing member (not shown)

may be inserted between the cage 210 and the bonnet; thereby, providing for a fluid tight seal as these components expand and contract due to temperature gradients.

Figure 2A:
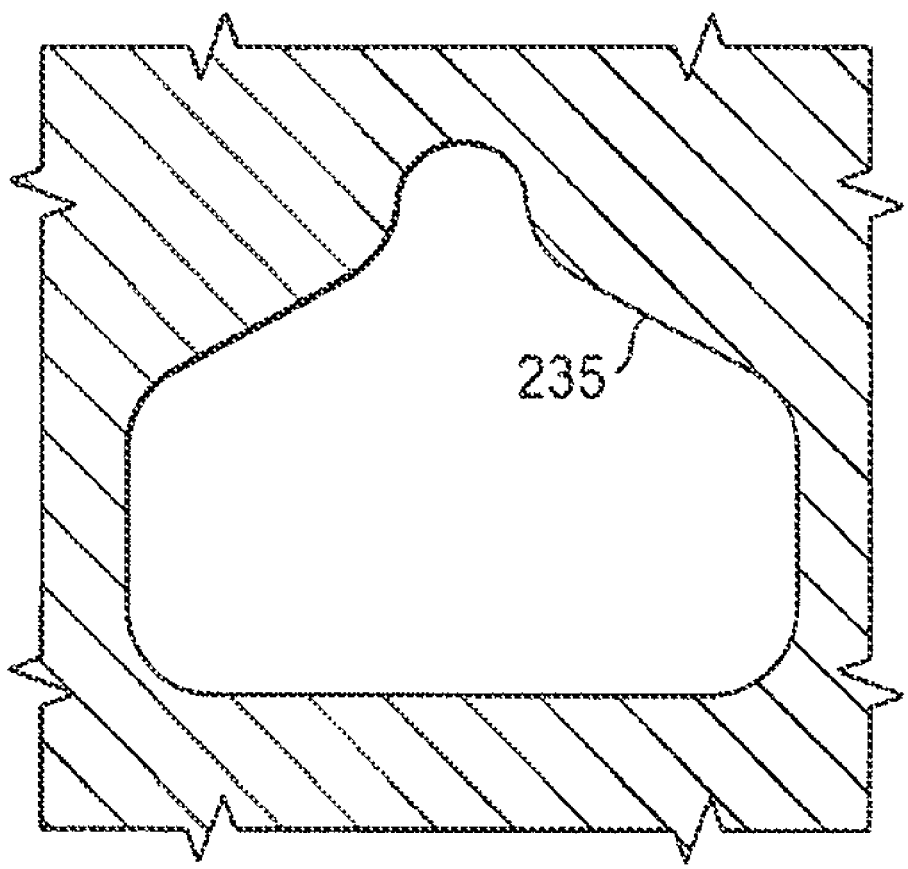
FIG. 2A illustrates one embodiment of the configuration for a cage port utilized in a pilot plug operated control valve in accordance with the present disclosure.

The cage 210 includes one or more cage ports 235 providing a fluid pathway between an interior of the cage 210 and an exterior of the cage 210 (e.g., a valve gallery, such as gallery 130). As illustrated in FIG. 2, in the closed position, the primary plug 215 is substantially adjacent and covering each of the cage ports 235. Each cage port 235 in the cage 210 may be one of a variety of distinct aperture shapes through the cage 210 to allow fluid flow to the exterior of the cage 210. A particular shape of the cage port 235 may depend, for example, on the desired flow capacity of the valve and on the desired flow characteristics of the valve (i.e., the relationship between the position of the primary plug 215, or stroke of the valve, and the resulting flow through the valve). For instance, typical cage ports 235 may be characterized as linear or modified linear, parabolic or modified parabolic, or equal percentage, to name a few. Turning briefly to FIG. 2A, one embodiment of the cage port 235 according to the cross section '2A'-'2A' is illustrated. Specifically, FIG. 2A illustrates an inverted non-linear cage port, such that as the valve is opened and the plug travels linearly downward to uncover the cage port, fluid flow through the port 235 is non-linearly proportional to the stroke distance that the stem 205 travels.

Alternatively, other embodiments of the cage ports 235 may be substantially rectangular, parabolic (e.g., half-moon), or, in some aspects, consist of multiple circular apertures in the cage 210. For instance, in certain fluid regulation applications where low noise may be a concern, the cage 210 may include multiple small holes through which the fluid may flow through as multiple streams of flow. The small holes may produce jets of a frequency high enough so that the human ear only experiences a fraction of the sound power. If these jets are flowing radially outward, the likelihood that adjacent jets will converge and lower their frequency may be very low. Flowing in the radially inward direction may cause adjacent jets to converge, thus reducing the effects of the noise attenuation.

Returning to FIG. 2, the primary plug 215 is disposed within the interior of the cage 210 with minimal clearance between the primary plug 215 and the cage 210. Typically, the primary plug 215 includes an upper portion including an outer wall 245 and a lower portion including an inner wall 250. The upper portion of the primary plug 215 may generally be cylindrical in shape and hollow, thus allowing fluid to flow there through. In the closed position, the outer wall 245 is substantially adjacent the cage ports 235, thus substantially restricting fluid flow from the upper portion through the cage 210 and to the gallery. The outer wall 245 may be secured to the inner wall 250 by a connecting web 247. As explained more fully with references to FIGS. 4-5, fluid may flow from the fluid inlet of the valve through the apertures in the connecting web 247 (e.g., a "spider") to reach the cage ports 235 when the valve is in the opened position. Further, in some embodiments, the connecting web 247 may provide additional structural strength to the primary plug 215 while still allowing fluid flow through the primary plug 215 to its upper portion.

The inner wall 250 of the primary plug 215, generally, is cylindrical in shape and secured to a base 217 of the primary plug 215. In some embodiments, the primary plug 215 may be cast as a single component, with the base 217 integral with the remaining portions of the primary plug 215. Alternatively the components of the plug may be formed separately and welded or mechanically joined to together to form a unitary element. As illustrated in FIG. 2, the inner wall 250 includes a reduced diameter upper section connected to the outer wall 245 via the web 247 and a lower section of increased diameter connected to the base 217. The base 217 also may include a substantially circular aperture 219 with a center of the aperture aligned with the longitudinal axis of the stem 205 and the primary plug 215. Thus, in some embodiments, the base 217 may be donut-shaped, thus allowing the stem 205 coupled to the pilot plug 220 to be inserted there through during assembly of the valve. As illustrated in FIG. 2, the base 217 is in mechanical contact with the primary seat 270. Fluid pressure from below may contribute to an effective seal between the primary seat 270 and the primary plug 215 when the valve is in the closed position; thereby, substantially preventing fluid communication from the gallery of the valve through the web 247 and into the interior of the cage 210.

In particular embodiments, the reduced diameter upper section is sized to allow the stem 205 to move linearly through a flow passage 240 between the stem 205 and the inner wall 250. At the reduced diameter upper section of the inner wall 250, a diameter of the flow passage 240 may be just slightly greater than a diameter of the stem 205; thereby, allowing for increased stability during movement of the stem 205 while providing a fluid communication path to the interior of the cage 210. For example, in some embodiments, the inner wall 250 may contain a guide bushing or be made from a material chosen to provide a guiding surface for the stem 205.

The pilot plug 220 is enclosed within a cavity formed by the increased diameter lower section of the interior wall 250 and is coupled to an inboard end of the stem 205. The pilot plug 220 and stem 205 may be secured by any appropriate connector, such as a compression fitting, lock pins (e.g., detent ring pins), or threaded bolts, to name but a few. Alternatively, the pilot plug 220 and the stem 205 may be cast as a single integral piece or welded into a unitary element. As with the other components of the valve, the construction of the pilot plug 220 and the stem 205 may depend on the type and properties of the fluid being regulated by the valve (e.g., temperature, pressure, corrosive characteristics). As shown in FIG. 2, the male seating surface 223 of the pilot plug 220 is in mechanical contact with the female surface 222 of the interior wall 250 when the valve is in the closed position; thereby, substantially preventing fluid flow through the flow passage 240 into the interior of the cage 210. In certain applications, the female and male seating surfaces 222 and 223, respectively, may have a special hardened finish or include material inserts.

The pilot plug 220 also includes one or more conduits 255 providing fluid pathways from below the pilot plug 220 to the cavity enclosing the pilot plug 220 formed by the increased diameter lower section of the inner wall 250. The conduits 255 may be substantially cylindrical in shape, or alternatively, may be any appropriate shape as to allow fluid communication there through. In some embodiments, as explained more fully with reference to FIG. 3, the conduits 255 may allow for fluid communication into the flow passage 240 when the valve is opened slightly from the closed position; thereby, allowing fluid pressure to increase in the interior of the cage 210.

One or more pilot springs 225 may also be enclosed within the cavity 219 defined by the increased diameter lower section of the interior wall 250. Generally, the pilot springs 225 apply a tensile force between the pilot plug 220 and the interior wall 250, thus urging the pilot plug 220 downward against a stop ring 230. In some embodiments, the pilot springs 225 may be one or more Belleville washer-type springs placed back-to-back. Alternatively, the pilot springs 225 may be one or more coil or helical springs. Further, in some embodiments, the pilot springs 225 may be positioned on an underside of the pilot plug 220, such as, between the stop ring 230 and the pilot plug 220.

In some embodiments, downward movement of the pilot plug 220 is stopped at a lower end of the flow passage 240 by the stop ring 230. The stop ring 230, may be a disk including one or more apertures there through that is detachably secured within a groove formed in the center aperture of the base 217; thereby, allowing the stop ring 230 to be removed from the base 217, such as (luring assembly or maintenance of the valve. Alternatively the stop ring 230 may be a cylindrical, washer shaped, or a donut shaped ring. The stop ring 230 may, thus, be snapped into place within the base 217, or alternatively, may be threaded into the base 217. In general embodiments, the stop ring 230 stops the pilot plug 230 in the cavity and may transmit a substantially downward force from the pilot plug 220 to the primary plug 215 as the valve is adjusted from the closed to open position.

Figure 3:
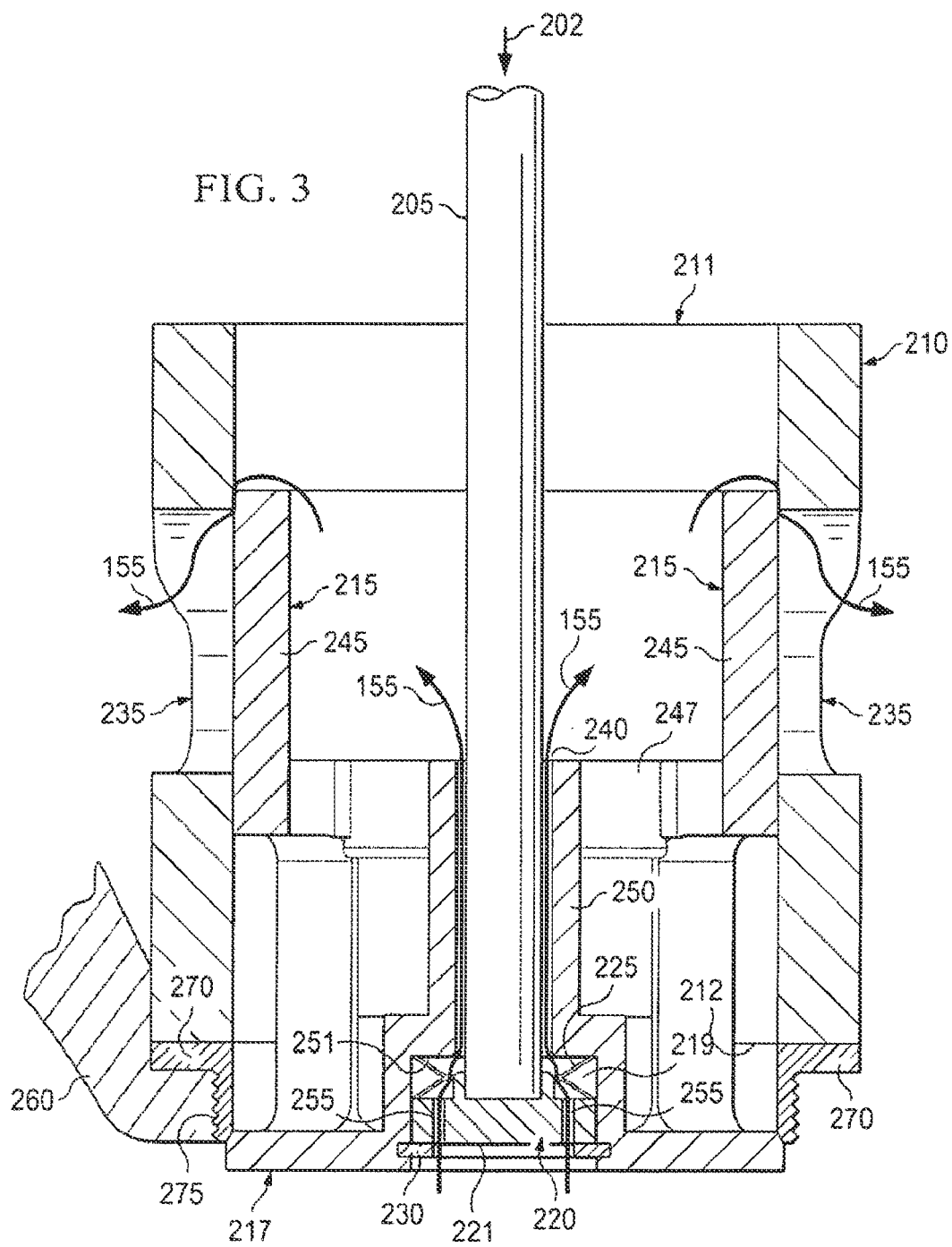
FIG. 3 illustrates a partial cross-sectional view of internal components of a pilot plug operated control valve upon initial opening of the valve in accordance with the present disclosure.

Continuing with FIG. 2, the primary seat 270 may be placed in contact with a lower surface of the cage 210 and provides a mechanical seal against the base 217 of the primary plug 215 when the valve is in the closed position. In some embodiments, the primary seat 270 may include a flanged portion to allow the primary seat 270 to be secured to the body of the valve, such as a bridge 260 of the valve body. For example, in some embodiments, the primary seat 270 may experience an upward force, thus tending to lift the primary seat 270 from the bridge 260. Depending on design considerations (such as fluid temperature or design of the cage 210, for example), the primary seat 270 may need to be restrained from such separation from the bridge 260. For instance, as shown in FIG. 2, the primary seat 270 and the bridge 260 may be secured by mechanical means, such as threaded bolts 265, for instance. Turning briefly to FIG. 3, the primary seat 270 may also be secured to the bridge 260 through a threaded connection 275.

Turning to the operation of the valve and valve components illustrated in FIG. 2, this figure illustrates the valve in the closed position, such that fluid communication between a valve inlet and a valve outlet may be substantially prevented. In the closed position, the base 217 of the primary plug 215 is in mechanical contact with the primary seat 270; thereby, substantially preventing fluid communication from the fluid inlet of the valve into the interior of the cage 210. Further, in the closed position, the pilot plug 220 is in mechanical contact with the interior wall 250, thereby, substantially preventing fluid communication from under the primary plug 215, through the conduits 255 and into the flow passage 240. Thus, the seal created by contact between the pilot plug 220 with the interior wall 250 combined the seal created by contact between the primary plug 215 in contact with the primary seat 270 may operate to substantially prevent fluid communication between the valve inlet and the valve outlet when the valve is in the closed position.

In some embodiments, the valve illustrated in FIG. 2 may fail closed while operating in the expanding flow direction, rather than tail open, as provided by other valve designs. Upon loss of actuator air pressure or signal, therefore, flow of the fluid 155 may tend to adjust the valve to the closed position.

In order to maintain the valve in the closed position, a valve actuator coupled to the stem 205 may apply an upward force 201 on the stem 205, tending to urge the stem 205 out of the flow passage 240 and compressing the pilot springs 225 against the interior wall 250 with the pilot plug 220. The actuator may thus exert the upward tensile force 201 on the stem 205 to overcome the downward spring force of the pilot springs 225, which tends to urge the pilot plug 220 in a downward direction toward the stop ring 230. In such fashion, the pilot plug 220 may be held in contact with a lower ledge 251 in interior wall 250, thus substantially preventing fluid flow to the flow passage 240.

In addition, a bottom surface of the base 217 may experience a force relative to the fluid pressure exerted on the area of the base bottom surface tending to urge the base 217 against the primary seat 270. In some embodiments, the fluid pressure is substantially equal to the pressure of the fluid at the fluid inlet of the valve. Further, a fluid pressure at the interior of the cage 210 may be less than or substantially less than the fluid pressure at the fluid inlet of the valve. Thus, a pressure differential (e.g., a line pressure) between the fluid under the primary plug 215 and the fluid in the interior of the cage 210 may help maintain the valve in the closed position by urging the primary plug 215 against the primary seat 270 and the male seating surface 223 of the pilot plug 220 against the female seating surface 222 of the primary plug 215. For instance, in some embodiments the pilot springs 225 may be chosen to be rigid enough to provide a stable connection between the primary plug 215 and the pilot plug 220. If the pilot springs 225 are not rigid enough, the primary plug 215 and the pilot plug 220 may "vibrate" relative to one another. Further, if the application requires that the valve fail-to-close, the spring force of the pilot springs 225 may be chosen such that, when the pilot plug 220 is seated against the upper ledge 251, the downward spring force may be less than the upward pressure unbalanced force. This may keep the pilot plug 220 closed due to pressure alone.

FIG. 3 illustrates a cross-sectional view of the pilot plug operated control valve described above with reference to FIG. 2 upon initial opening of the valve. Generally, upon initial opening of the valve, the pilot plug 220 is urged downward to become unseated from the interior wall 250 of the primary plug 215, thus allowing fluid communication to the flow passage 240. The pilot plug 220, thus, may come into contact or near contact with the stop ring 230 upon initial opening of the valve while transmitting substantially no force to the stop ring 230. The primary plug 215, however, remains in contact with the primary seat 270; thereby, maintaining the seal between the primary plug 215 and the primary seat 270, as shown in this figure.

In order to open the valve, the valve actuator supplies a downward force 202 to the stem 205; thereby, urging the stem linearly downward through the flow passage 240. The actuator force 202 tending to open the valve, therefore, may be aligned downward in addition to the downward spring force of the pilot springs 225. Thus, the sum of the downward actuator force 202 and the downward spring force of the pilot springs 225 may be greater than the unbalanced force on the pilot plug 220 created by the pressure differential between the fluid under the primary plug 215 and the fluid in the interior of the cage 210. The upward force of the fluid pressure may be calculated based on the pressure differential in force per unit area (e.g., pounds per square inch) multiplied by the area (e.g., square inches) enclosed by the pilot plug seating diameter. The pilot plug seating area diameter 221 may be defined by the circumferential line of contact between the pilot plug 220 and the plug 215.

As the stem 205 moves linearly downward, the pilot plug 220 is unseated from mechanical contact with the ledge 251 of interior wall 250 of the primary plug 215. Thus, fluid 155 may be allowed to flow from under the primary plug 215, past the stop ring 230 and conduits 255, and into the flow passage 240. The initial flow of fluid 155 and the pressure drop when the valve is first opened, therefore, may be through the flow passage 240 and into the interior of the cage 210, rather than between the base 217 and primary seat 270 and through the web 247 into the interior of the cage 210. For example, as shown in FIG. 3, the primary plug 215 covers the ports 235 such that little fluid 155 passes through the ports 235. The resistance to fluid flow in the flow passage 240 may, therefore, be less than or substantially less than the resistance to fluid flow between the primary plug 215 and the cage 210.

As fluid 155 continues to flow through the flow passage 240, the fluid pressure within the interior of the cage 210 may begin to approach the fluid pressure under the primary plug 215. This pressure differential may thus be reduced with more flow of the fluid 155 through the flow passage 240. As this pressure differential is reduced, the pressure force tending to urge the base 217 against the primary seat 270 may also be reduced and approach near zero.

Figure 4:
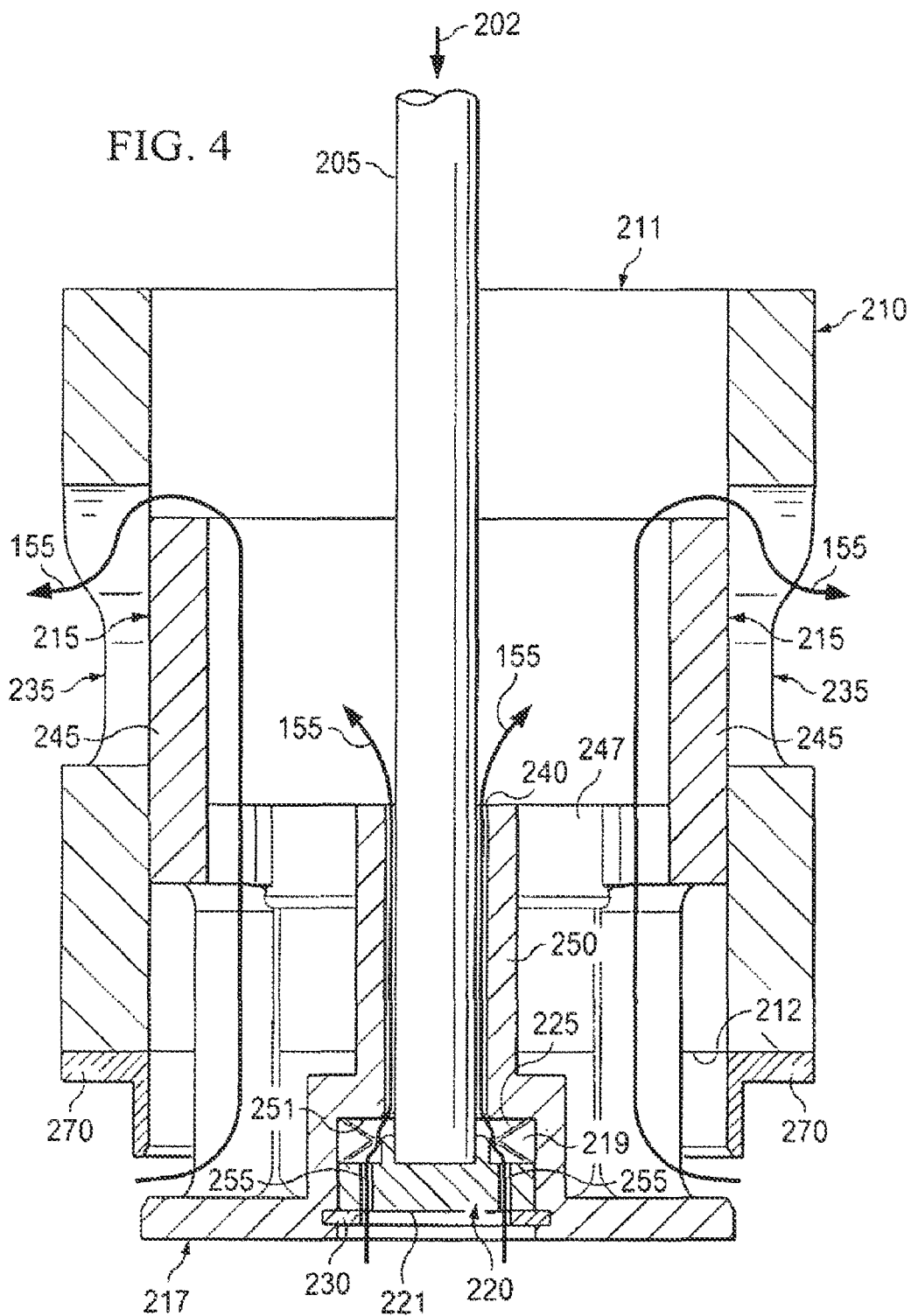
FIG. 4 illustrates a partial cross-sectional view of internal components of a pilot plug operated control valve in a partially opened position in accordance with the present disclosure.

FIG. 4 illustrates a cross-sectional view of the pilot plug operated control valve described above with reference to FIG. 2 showing the valve in a partially opened position. Once the valve is initially opened and the pressure differential between the fluid pressure below the primary plug 215 and the interior of the cage 210 approaches zero, additional downward movement of the stem 205 may adjust the valve to the partially opened position. As the stem 205 moves downward, the pilot plug 220 contacts the stop ring 230 and transmits the downward force 202 from the stem 205 to the stop ring 230. The stop ring 230, in turn, transmits the downward force 202 to the base 217 of the primary plug 215. The primary plug 215, therefore, begins to move linearly downward such that the exterior wall 245 begins to uncover the ports 235. In some embodiments, the downward force 202 to move the stem 205 additionally downward may need to overcome an upward-directed frictional force between the cage 210 and the primary plug 215, as well as fluid dynamic forces generated by the flow of fluid 155 through the flow passage 240, which may tend to draw the primary plug 215 upward against the primary seat 270.

As the ports 235 are uncovered by the primary plug 215, flow resistance to the flow of fluid 155 between the cage 210 and the primary plug 215 may be reduced and become less than the flow resistance to the flow of fluid 155 through the flow passage 240. Thus, the flow of fluid 155 tends to be through the web 247 and into the interior of the cage 210, as may be desired during normal operation (e.g., throttling) of the valve. Further, the pressure drop through the valve at the partially opened position illustrated in FIG. 4 may consist substantially of a controlled pressure drop across the ports 235.

Figure 5:
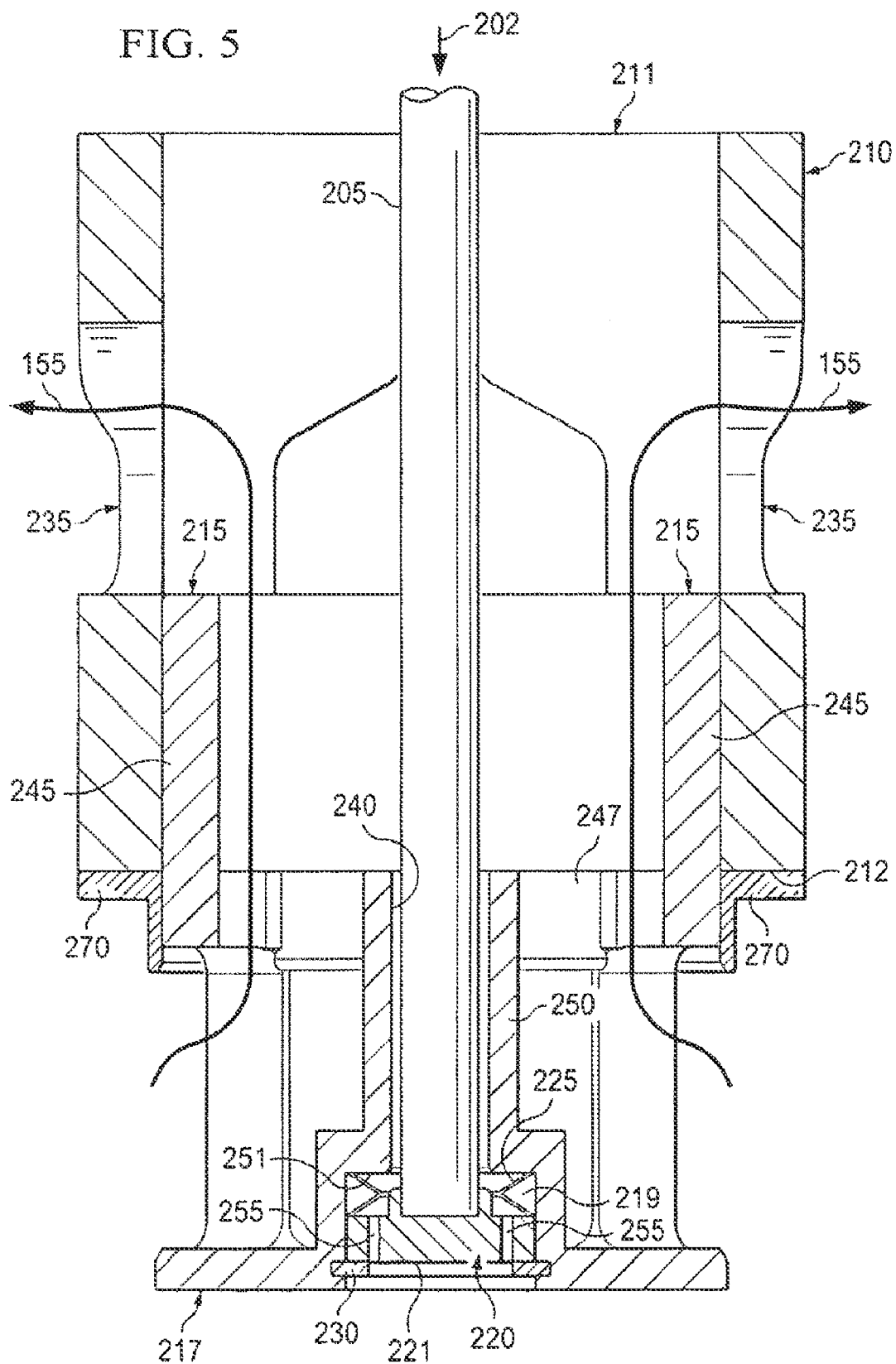
FIG. 5 illustrates a partial cross-sectional view of internal components of a pilot plug operated control valve in a fully opened position in accordance with the present disclosure.

FIG. 5 illustrates a cross-sectional view of the pilot plug operated control valve described above with reference to FIG. 2 showing the valve in an open position. As the valve actuator continues to exert the downward force 202 on the stem 205, the pilot plug 220 continues to urge the primary plug 215 downward; thereby, uncovering the ports 235. When the ports 235 of the cage 210 are substantially uncovered, flow of fluid 155 may be substantially through the web 247 rather than the flow passage 240 due to the reduced flow resistance through the larger apertures of the web 247 as compared to the flow passage 240.

The pressure drop through the valve in the open position may consist of the pressure drop of the fluid 155 from its fluid inlet pressure through the web 247 and the ports 235. Thus, the fluid pressure of the fluid 155 at the exterior of the cage 210 may be less or substantially less than the fluid pressure of fluid 155 at the valve inlet.

Figure 6:
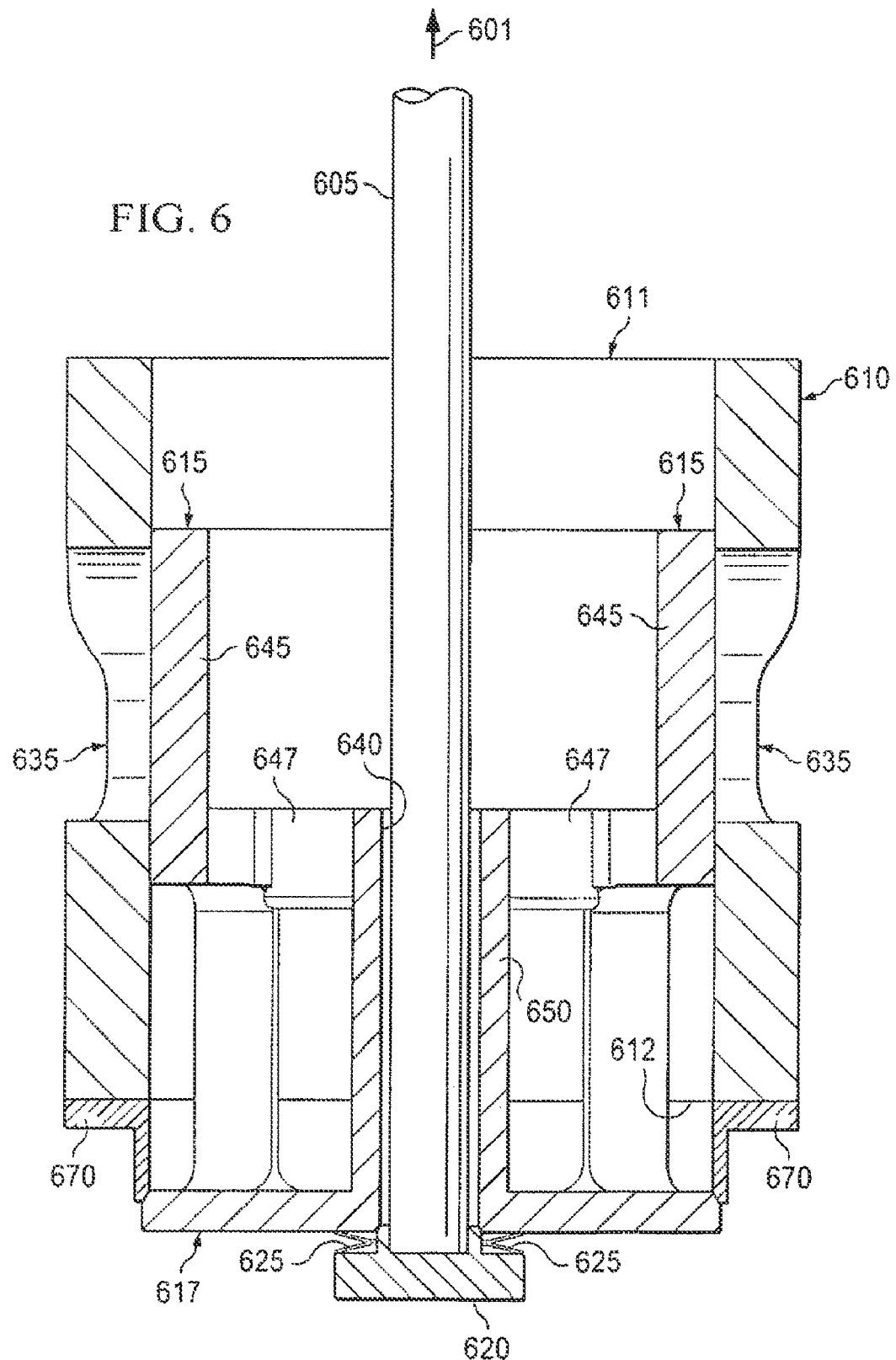
FIG. 6 illustrates a partial cross-sectional view of internal components of an alternative embodiment of a pilot plug operated control valve in accordance with the present disclosure.

FIG. 6 illustrates a partial cross-sectional view of internal components of an alternative embodiment of a pilot plug operated control valve in accordance with the present disclosure. The pilot plug operated control valve in FIG. 6 includes a stem 605; a cage 610 including a top edge 611, a bottom edge 612, and one or more cage ports 635; a primary plug 615 including an outer wall 645 connected by one or more connecting webs 647 to an inner wall 650 defining a flow passage 640 and a base 617; a pilot plug 620; one or more pilot springs 625; and a primary seat 670. In some embodiments, the stem 605, the cage 610, and the primary seat 670 are substantially similar to those corresponding components shown in FIGS. 2-5.

In this alternative embodiment, the flow passage 640 of the primary plug 615 may be substantially constant in diameter without an increased diameter lower portion, such as the primary plug 215 illustrated in FIG. 2. Thus, the stem 605 may extend through the flow passage 640 and be coupled at an inboard end to the pilot plug 620. The pilot plug 620, therefore, may not be constrained in a cavity defined by an increased diameter lower portion of the flow passage 640. Further, in such embodiments, the valve may not include a stop ring, such as the stop ring 230 illustrated in FIGS. 2, 3-5.

One or more pilot springs 625 may be disposed between the base 617 and a top surface of the pilot plug 620. The pilot springs 625 may be, for example, helical springs or Belleville washers. In certain embodiments, the pilot springs 625 may be secured (e.g., welded) to the base 217 and the pilot plug 625; thereby, permitting force transfer between the pilot plug 620 and the primary plug 615 when a force is applied to the stem 605.

As illustrated in FIG. 6, the valve is in a closed position where the pilot plug 620 is in mechanical contact with the primary plug 615; thereby, substantially preventing fluid communication through the flow passage 640. In such a position, the pilot springs 625 may exert a downward spring force on the pilot plug 620; thereby, urging the pilot plug 620 away from the primary plug 615. Opposing the downward spring force may be an upward force 601 exerted on the stem 605 by a valve actuator (not shown). This upward force 601 is transmitted to the pilot plug 620 and maintains, at least in part, the mechanical seal between the pilot plug 620 and the primary plug 615 in the valve closed position. Further, an upwardly directed force due to fluid pressure may be exerted on the pilot plug 620; thus, also helping maintain, at least in part, the seal between the pilot plug 620 and the primary plug 615.

Upon initial opening of the valve illustrated in FIG. 6, the valve actuator may exert a downward force on the stem 605; thereby, unseating the pilot plug 620 from the primary plug 615. Fluid, such as fluid 155, may thus flow over the pilot plug 620 and past the pilot springs 625 to enter the flow passage 640. In some embodiments, the pilot plug 220 may be substantially solid with no flow conduits there through, such as the conduits 255 of the pilot plug 215. As the stem 605 and pilot plug 620 are continually urged downward to open the valve, the downward force may be transmitted from the pilot plug 620 to the primary plug 615 via the secured pilot springs 625. The primary plug 615 may thus move linearly downward through the cage 610; thereby, exposing the one or more cage ports 635 and allowing fluid to flow from under the primary plug 615, through one or more connecting web apertures 647, and through the cage ports 635 to a valve outlet.

Figure 7:
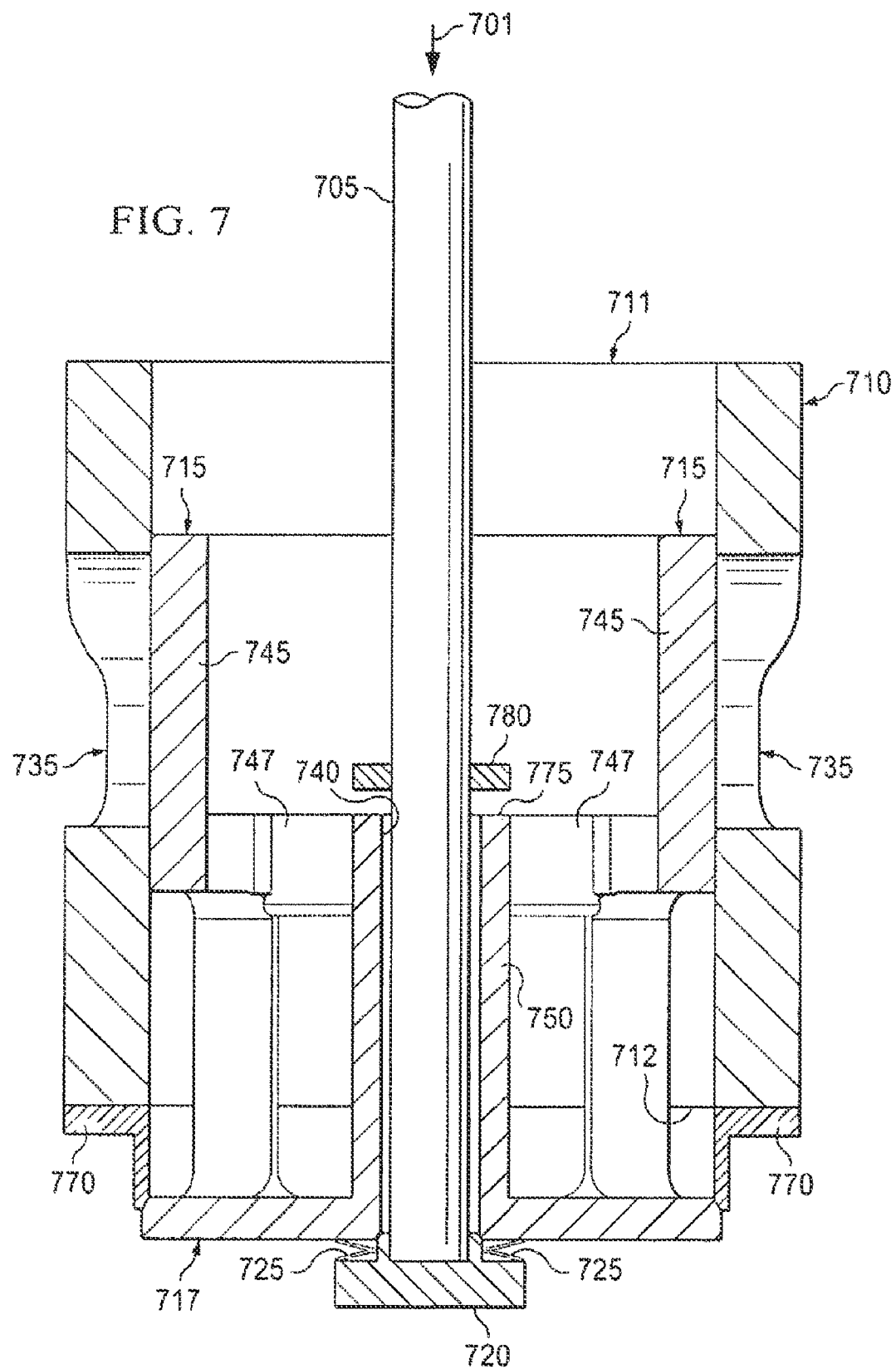
FIG. 7 illustrates a partial cross-sectional view of internal components of another alternative embodiment of a pilot plug operated control valve in accordance with the present disclosure.

FIG. 7 illustrates a partial cross-sectional view of internal components of another alternative embodiment of a pilot plug operated control valve in accordance with the present disclosure. The pilot plug operated control valve in FIG. 7 includes a stem 705; a cage 710 including a top edge 711, a bottom edge 712, and one or more cage ports 735; a primary plug 715 including an outer wall 745 connected by one or more connecting webs 747 to an inner wall 750 defining a flow passage 740 and a base 717; a pilot plug 720; one or more pilot springs 725; and a primary seat 770. The embodiment of the valve illustrated in FIG. 7 also includes a contact member 780 detachably secured to the stem 705 proximate to an upper surface 775 of the primary plug 715.

In this alternative embodiment, the contact member 780 may be a collar installed on the stem 705 once the stem 705 is assembled into the flow passage 740. Alternatively, the contact member 780 may be a multi-piece member, such as a split-ring assembly, which may be assembled over the stem 705. The contact member 780 may also be one or more contact pins inserted into openings in the stem 705. Further, the contact member 780 may be installed on the stem 705 proximate to the upper surface 775 of the primary plug 715.

As the valve is adjusted from the closed to the open position, the pilot plug 720 is urged downward through the flow passage 740 by a downward force 701. One or more pilot springs 725, which may be secured (e.g., welded) to one or both of the primary plug 715 and the pilot plug 720, may also help urge the pilot plug 720 downward via a downward spring force. In some embodiments, however, the pilot springs 725 may be eliminated. As the pilot plug 720 is urged downward, a top chamfered portion (e.g., a male seating surface) is unseated from a chamfered portion of the primary plug 715 (e.g., a female seating surface). This allows fluid to flow through the flow passage 740; thereby, helping to equalize pressure differential between fluid under the primary plug 715 and fluid in an interior of the cage 710.

As the pilot plug 720 is further urged downward by the force 701, the contact member 780 contacts the upper surface 775 of the primary plug 715. The downward force 701 is, thus, transmitted to the primary plug 715, urging the plug 715 downward. The primary plug 715 may be unseated from the primary seat 770; thereby, allowing fluid communication into the interior of the cage 710 through the connecting web 747. Fluid communication through the cage ports 735 and to a fluid outlet of the valve may thus be achieved.

FIG. 8 illustrates a partial cross-sectional view of internal components of a further alternative embodiment of a pilot plug operated control valve in accordance with the present disclosure. The pilot plug operated control valve in FIG. 8 includes a stem 805, a cage 810 including a top edge 811, a bottom edge 812, and one or more cage ports 835; a primary plug 815 including an outer wall 845 connected by one or more connecting webs 847 to an inner wall 850 defining a flow passage 840 and a base 817; a pilot plug 820; one or more pilot springs 825; and a primary seat 870. In the embodiment of the valve illustrated in FIG. 8, the pilot plug 820 may include an unthreaded through-hole 880 while the primary plug 815 includes a blind threaded hole 885. Further, this embodiment includes a bolt 875 insertable through the holes 880 and 885 and securable to the primary plug 815 in the blind threaded hole. The bolt 875 may extend through the through-hole 880 so as to create a gap 890 between a bottom surface of the pilot plug 820 and the bolt head of the bolt 875. Although only one bolt 875 is illustrated, one or more additional bolts and corresponding holes in the pilot plug 820 and the primary plug 815 may be provided.

As the valve is adjusted from the closed to the open position, the pilot plug 820 is urged downward through the flow passage 840 by a downward force 801. One or more pilot springs 825, which may be secured (e.g., welded) to the primary plug 815 and, in some implementations, the pilot plug 820, may also help urge the pilot plug 820 downward via a downward spring force. In some embodiments, however, the pilot springs 825 may be eliminated. As the pilot plug 820 is urged downward, a top chamfered portion (e.g., a male seating surface) is unseated from a chamfered portion of the primary plug 815 (e.g., a female seating surface). This allows fluid to flow through the flow passage 840; thereby, helping to equalize pressure differential between fluid under the primary plug 815 and fluid in an interior of the cage 810.

As the pilot plug 820 is further urged downward by the force 801, the pilot plug 820 contacts the bolt head of the bolt 875. The pilot plug 820 thus urges the bolt 875 downward, which transmits the downward force 810 to the primary plug 815. As the primary plug 815 is urged downward, it is unseated from the primary seat 870; thereby, allowing fluid communication into the interior of the cage 810 through the connecting web 847. Fluid communication through the cage ports 835 and to a fluid outlet of the valve may thus be achieved.

A number of implementations of the pilot plug operated control valve have been described, and several others have been mentioned or suggested. Other implementations are within the scope of the disclosure and claims. Some of the advantages of the pilot plug operated control valve have been discussed in the summary of this disclosure. Furthermore, those skilled in the art will readily recognize additional advantages that a variety of additions, deletions, alterations, and substitutions may be made to these implementations while still achieving fluid regulation with a pilot plug operated control valve. Thus, the scope of protected subject matter should be judged based on the following claims, which may capture one or more aspects of one or more implementations.

What is claimed is:

1. A valve comprising:
   a body comprising a fluid inlet and a fluid outlet in fluid communication with a gallery, the gallery being closed at a first end with a bonnet;
   a cage disposed within the gallery, the cage comprising at least one cage port there through allowing fluid communication between the fluid inlet and the fluid outlet when the valve is in an open position;
   a plug movably disposed within the cage, the plug comprising an outer wall and an inner wall, the outer and inner walls interconnected via a connecting web, the outer wall of the plug disposed adjacent the cage port and being movable linearly to substantially prevent fluid communication between the fluid inlet and the fluid outlet when the valve is in a closed position, the plug movable linearly within the cage to allow fluid communication between the fluid inlet and the fluid outlet when the valve is in the open position, the inner wall defining a flow passage through at least a portion of the plug;
   a stem extending through the flow passage, an inboard end of the stem disposed in a lower portion of the flow passage, an outboard end of the stem extending through the cage and an aperture in the bonnet to an exterior of the body; and
   a pilot plug coupled to the inboard end of the stem, the pilot plug disposed in the lower portion of the flow passage, the pilot plug adapted to transfer downward force from the stem to the plug and thereby urging the plug downward through the cage when the stem moves linearly downward through the flow passage away from the bonnet to adjust the valve from the closed position to the open position.

2. The valve of claim 1 further comprising a stop ring detachably secured to the plug proximate to the lower portion of the flow passage, the pilot plug adapted to transfer downward force from the stem to the plug by contacting the stop ring of the plug.

3. The valve of claim 2, wherein the lower portion of the flow passage includes an increased diameter portion, the stop ring detachably secured to the plug therein.

4. The valve of claim 1, wherein the pilot plug transfers upward force from the stem to the plug by contacting the plug and thereby urging the plug upward through the cage when the stem moves linearly upward through the flow passage toward the bonnet to adjust the valve from the open position to the closed position.

5. The valve of claim 1, wherein the plug further comprises a base, the valve further comprising a seat detachably secured to the cage, wherein in a closed position the base of the plug is in contact with the seat substantially prevents fluid communication between the fluid inlet and the gallery.

6. The valve of claim 5, wherein the body further comprises a bridge extending into the gallery from the body, the seat detachably secured to the bridge.

7. The valve of claim 1, wherein the cage port is formed in an upper half of the cage proximate to the first end of the gallery.

8. The valve of claim 7, wherein the at least one cage port comprises at least one of the following:
an equal percentage characterized cage port;
a linear characterized cage port;
a parabolic characterized cage port;
a modified linear characterized cage port;
a modified parabolic characterized cage port; or
a plurality of apertures formed along a substantial entirety of a circumference of the cage.

9. The valve of claim 1, wherein the cage port comprises a funneled upper portion closest to the first end and a substantially square lower portion opposite the funneled upper portion.

10. The valve of claim 1 further comprising at least one pilot spring in contact with the pilot plug and the plug.

11. The valve of claim 10, wherein the pilot spring comprises a coil spring or a Belleville washer.

12. The valve of claim 10 wherein the pilot spring is located in a cavity defined by a downward facing ledge and a cylindrical wall of an increased diameter lower portion of the flow passage.

13. The valve of claim 12, wherein the pilot spring contacts the downward facing ledge and an upper surface of the pilot plug.

14. The valve of claim 1, wherein the pilot plug has at least one flow conduit disposed there through.

15. The valve of claim 14, wherein the pilot plug is in contact with the plug thereby substantially preventing fluid communication between the fluid inlet and the flow passage in the plug when the valve is in the closed position, the flow conduit allowing fluid communication between the fluid inlet and the flow passage of the plug as the valve is adjusted from the closed position to the open position.

16. The valve of claim 15, wherein the pilot plug comprises a first seating surface and the plug comprises a second seating surface, the first and second seating surfaces in contact thereby substantially preventing fluid communication between the fluid inlet and the flow passage in the plug when the valve is in the closed position.

17. The valve of claim 16, wherein at least one of the first and second surfaces comprises, at least in part, an increased hardness material.

18. The valve of claim 1 further comprising a contact member disposed on the stem, the contact member adapted to contact an upper surface of the inner wall of the plug when the valve is adjusted from the closed position to the open position.

19. The valve of claim 1 further comprising an actuator coupled to the stem, the actuator adapted to apply an upward force on the pilot plug to bring the pilot plug in contact with the plug as the valve is adjusted to the closed position.

20. The valve of claim 1, wherein the plug further comprises a lattice connecting the inner wall and the outer wall of the plug, the lattice comprising one or more apertures allowing fluid communication there through.

21. The valve of claim 1, the pilot plug comprising at least one aperture there through, the valve further comprising at least one bolt secured to the plug through the aperture of the pilot plug, the bolt adapted to transmit a downward force from the pilot plug to the plug when the valve is adjusted from the closed position to the open position.

22. A method of regulating fluid with a valve, comprising:
providing a valve in fluid communication with a fluid inlet and a fluid outlet, the valve comprising:
a body comprising a gallery in fluid communication with the fluid inlet and the fluid outlet, the gallery being closed at a first end with a bonnet;
a cage disposed within the gallery, the cage comprising at least one cage port there through;
a plug movably disposed within the cage, the plug comprising an outer wall and an inner wall, the outer and inner walls interconnected via a connecting web, the outer wall of the plug disposed adjacent the cage port;
a stem extending through a flow passage, an inboard end of the stem disposed in a lower portion of the flow passage, an outboard end of the stem extending through the cage and an aperture in the bonnet to an exterior of the body;
a stop ring detachably secured to the plug proximate to the lower portion of the flow passage;
a pilot plug coupled to the inboard end of the stem, the pilot plug disposed in the lower portion of the flow passage; and
a seat adjacent a bottom surface of the cage, the plug in contact with the seat;
providing a fluid to the fluid inlet;
applying a first downward force on the pilot plug via the stem;
unseating the pilot plug from the inner wall; and
allowing a portion of the fluid to communicate from the fluid inlet through the flow passage.

23. The method of claim 22 wherein allowing a portion of the fluid to communicate from the fluid inlet through the flow passage comprises allowing a portion of the fluid to communicate from the fluid inlet through one or more conduits disposed through the pilot plug to the flow passage.

24. The method of claim 22, wherein the valve further comprises at least one pilot spring in contact with the plot plug and the plug, the pilot spring exerting a downward spring force on the pilot plug, the sum of the downward spring force and the first downward force greater than an upward fluid force exerted on the pilot plug, the upward fluid force substantially equal to a differential fluid pressure across the pilot plug times a surface area defined by a circumference of contact between the pilot plug and the inner wall.

25. The method of claim 24 further comprising:
applying a second downward force on the pilot plug via the stem to move the pilot plug downward;
contacting the stop ring of the plug with a lower surface of the pilot plug;
unseating the plug from the seat;
translating the plug downward to expose at least a portion of the at least one cage port; and allowing a portion of the fluid to communicate between the fluid inlet and the at least one cage port through a connecting web.

26. The method of claim 25, wherein applying a second downward force on the pilot plug via the stem comprises applying a second downward force greater than a difference between a second upward fluid force substantially equal to a second differential fluid pressure across the plug times a surface area defined by a circumference of contact between the plug and the seat and the downward spring force.

27. A method of regulating fluid with a valve, comprising:
providing a valve in fluid communication with a fluid inlet and a fluid outlet, the valve comprising:
a body comprising a gallery in fluid communication with the fluid inlet and the fluid outlet, the gallery being closed at a first end with a bonnet;
a cage disposed within the gallery, the cage comprising at least one cage port there through;
a plug movably disposed within the cage, the plug comprising an outer wall and an inner wall, the outer and inner walls interconnected via a connecting web, the outer wall of the plug disposed adjacent the cage port;
a stem extending through a flow passage, an inboard end of the stem disposed in a lower portion of the flow passage, an outboard end of the stem extending through the cage and an aperture in the bonnet to an exterior of the body;
a contact member disposed on the stem;
a pilot plug coupled to the inboard end of the stem, the pilot plug disposed in the lower portion of the flow passage; and
a seat adjacent a bottom surface of the cage, the plug in contact with the seat;
providing a fluid to the fluid inlet;
applying a first downward force on the pilot plug via the stem;
unseating the pilot plug from the inner wall;
allowing a portion of the fluid to communicate from the fluid inlet through the flow passage;
applying a second downward force on the pilot plug via the stem to move the pilot plug downward;
contacting at least one of an upper surface of the interior wall of the plug or the connecting web with the contact member;
unseating the plug from the seat;
translating the plug downward to expose at least a portion of the at least one cage port; and
allowing a portion of the fluid to communicate between the fluid inlet and the at least one cage port through the connecting web.

28. The method of claim 27, wherein applying a second downward force on the pilot plug via the stem comprises applying a second downward force greater than a second upward fluid force, the second upward fluid force substantially equal to a second differential fluid pressure across the plug times a surface area defined by a circumference of contact between the plug and the seat.

29. A method of regulating fluid with a valve, comprising:
providing a valve in fluid communication with a fluid inlet and a fluid outlet, the valve comprising:
a body comprising a gallery in fluid communication with the fluid inlet and the fluid outlet, the gallery being closed at a first end with a bonnet;
a cage disposed within the gallery, the cage comprising at least one cage port there through;
a plug movably disposed within the cage, the plug comprising an outer wall and an inner wall, the outer wall of the plug disposed adjacent the cage port;
a stem extending through a flow passage; an inboard end of the stem disposed in a lower portion of the flow passage, an outboard end of the stem extending through the cage and an aperture in the bonnet to an exterior of the body;
a pilot plug comprising at least one aperture there through, the pilot plug coupled to the inboard end of the stem, the pilot plug disposed in the lower portion of the flow passage;
at least one bolt secured to the plug through the aperture of the pilot plug; and
a seat adjacent a bottom surface of the cage, the plug in contact with the seat;
providing a fluid to the fluid inlet;
applying a first downward force on the pilot plug via the stem;
unseating the pilot plug from the inner wall;
allowing a portion of the fluid to communicate from the fluid inlet through the flow passage;
applying a second downward force on the pilot plug via the stem to move the pilot plug downward;
contacting the bolt coupled to the plug through the aperture of the pilot plug with a bottom surface of the pilot plug;
unseating the plug from the seat;
translating the plug downward to expose at least a portion of the at least one cage port; and
allowing a portion of the fluid to communicate between the fluid inlet and the at least one cage port through a connecting web.

* * * * *